Aug. 18, 1970   J. W. MATTINGLY   3,524,208
MOTOR DRIVEN TOOTHBRUSH
Filed Jan. 15, 1968   2 Sheets-Sheet 1
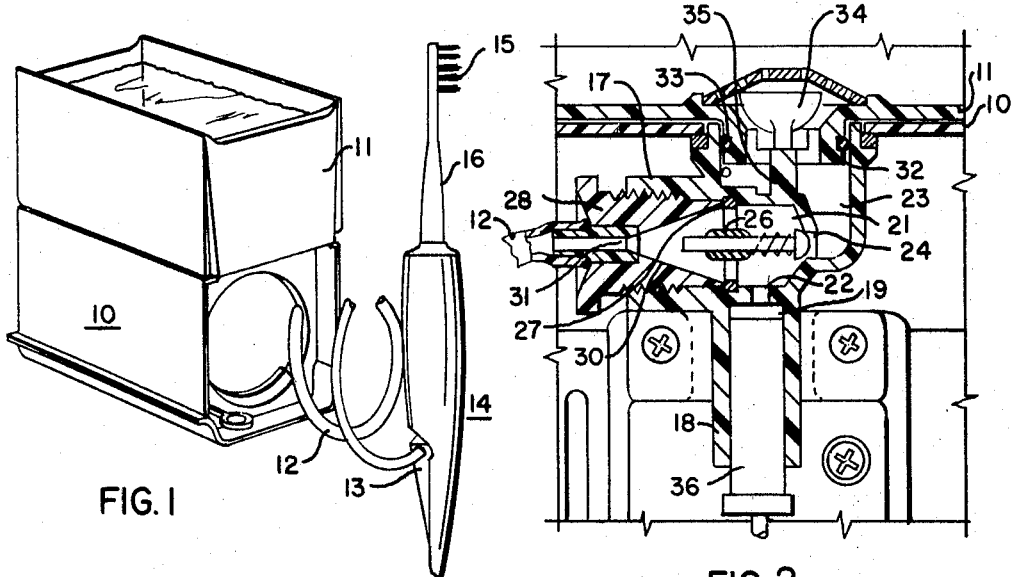
FIG. 1
FIG. 2
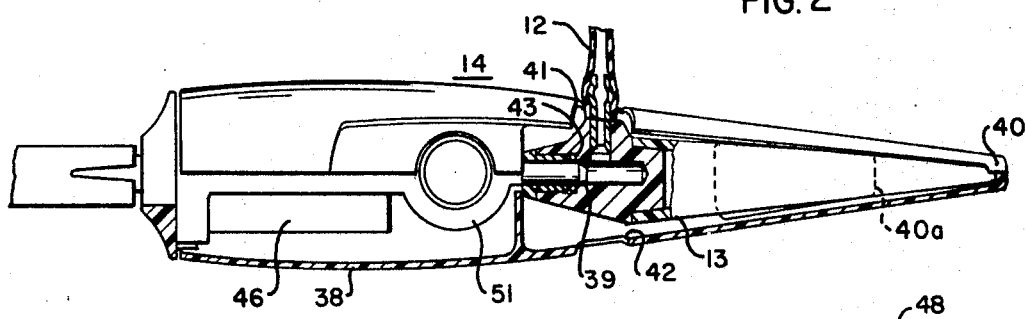
FIG. 3
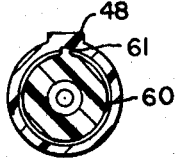
FIG. 5
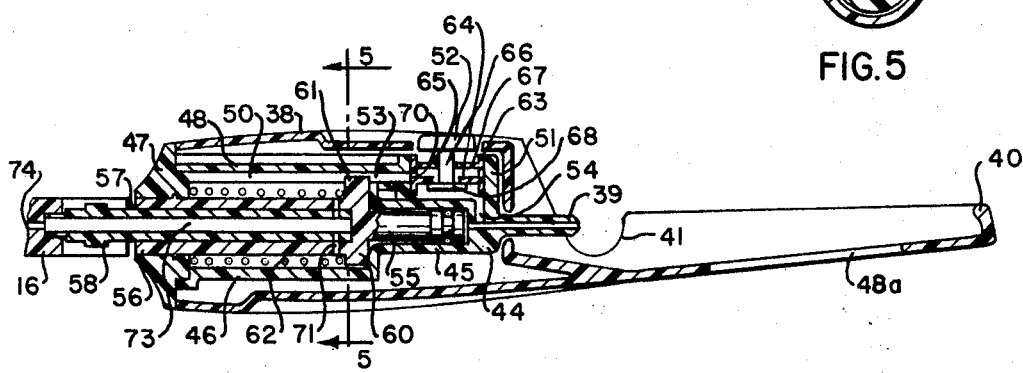
FIG. 4
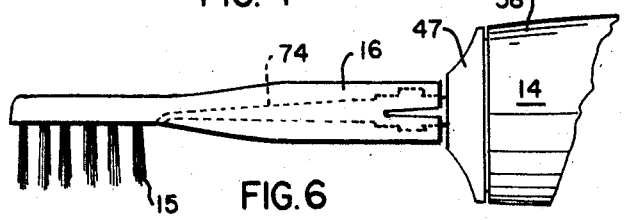
FIG. 6
INVENTOR.
By John W Mattingly
ATTORNEYS Aug. 18, 1970  J. W. MATTINGLY  3,524,208
MOTOR DRIVEN TOOTHBRUSH
Filed Jan. 15, 1968  2 Sheets-Sheet 2
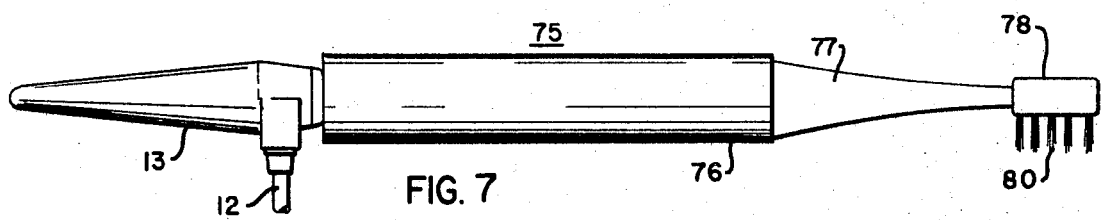
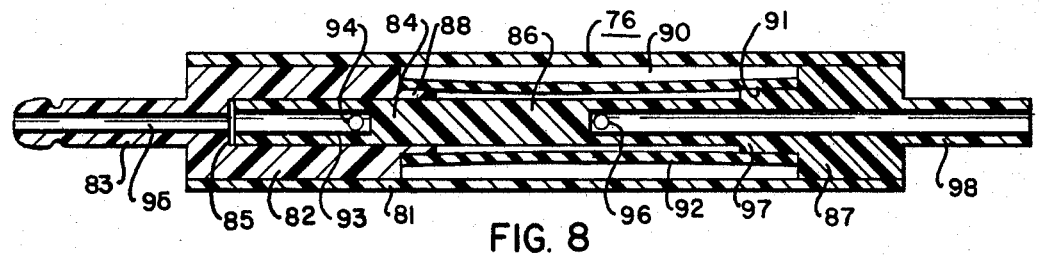
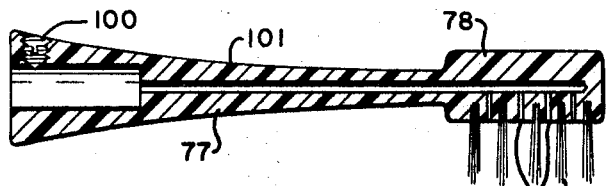
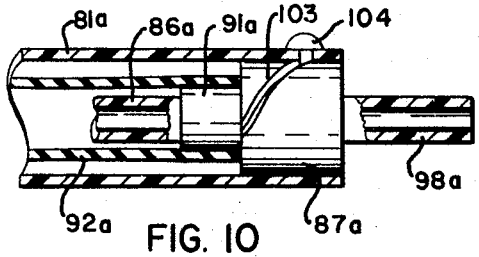
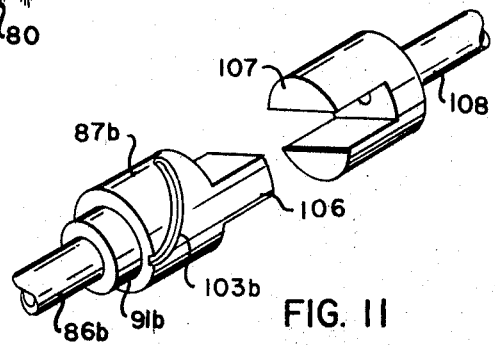
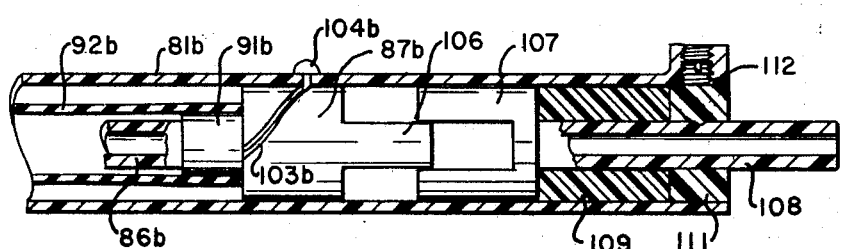
INVENTOR.
John W. Mattingly
ATTORNEYS United States Patent Office 3,524,208
Patented Aug. 18, 1970

3,524,208
MOTOR DRIVEN TOOTHBRUSH
John W. Mattingly, Fort Collins, Colo., assignor to Aqua Tec Corporation, Fort Collins, Colo., a corporation of California
Filed Jan. 15, 1968, Ser. No. 697,774
Int. Cl. A46b *13/06;* A47k *7/04*
U.S. Cl. 15—22       10 Claims

ABSTRACT OF THE DISCLOSURE

A hydraulic motor driven toothbrush comprises a handle having an expansible chamber hydraulic motor therein for producing reciprocating or oscillating movement of the brush. The motor is energized by a stream of liquid pressure pulses supplied from a source such as an oral hygiene appliance of the intermittent pulse jet type. The frequency of the pulses determines the rate of reciprocation or of oscillation of the brush.

---

This invention relates to motor driven toothbrushes and particularly to an improved motor driven toothbrush utilizing a hydraulic drive.

Electric motor driven toothbrushes have been provided heretofore which employ various types of driving connections. These devices have proved satisfactory for a wide range of applications. As an adjunct to the toothbrush an oral hygiene appliance is available which provides a stream of water of small cross section which is delivered in a jet of intermittent equal pulses and effects a cleaning of areas of the teeth and gums not normally reached by the toothbrush. One form of this appliance is disclosed in my U.S. Letters Pat. No. 3,227,158, issued Jan. 4, 1966, and assigned to the same assignee as the present invention. It is desirable to provide a motor driven toothbrush which can employ the same electric motor as that which drives the intermittent water pulse appliance. Accordingly, it is an object of this invention to provide an improved motor driven toothbrush which can be driven by the output stream of a pulsed jet oral hygiene appliance.

It is another object of this invention to provide a motor driven toothbrush including an improved motor drive arrangement.

It is another object of this invention to provide an improved hydraulic motor driven toothbrush.

Briefly, in carrying out the invention in one embodiment thereof, a motor driven toothbrush is provided which is hydraulically actuated and may be operated from the output of an oral hygiene appliance of the type which delivers a stream of water in a continuous series of spaced equal pressure pulses. The hydraulic motor comprises a piston directly connected to the brush and which is spring biased to its minimum volume position. A supply of intermittent pressure pulses is connected to the cylinder and on each pressure pulse the piston is forced forward and then returned during the rest between pulses.

In another embodiment of the invention, a similar arrangement of a piston is employed and the biasing means comprises a tube of elastic material which also serves the function of providing a surge chamber and water flow passage during the operation of the device. In this device an arrangement is provided to convert the reciprocating movement of the piston to rotating or oscillating movement of the brush.

The features of novelty which characterize this invention are pointed out with particularity in the claims annexed to and forming a part of this specification. The invention itself, however, both as to its organization and method of operation together with further objects and advantages thereof will be best understood by reference to the following description taken in connection with the accompanying drawings in which:

FIG. 1 is a perspective view of an oral hygiene appliance of the intermittent jet type connected to drive a toothbrush embodying the invention;

FIG. 2 is a sectional view of the pump employed in the appliance of FIG. 1;

FIG. 3 is a plan view partly in section of the mechanism of the toothbrush of FIG. 1;

FIG. 4 is a sectional elevation view of the device of FIG. 3;

FIG. 5 is a sectional view taken along the line 5—5 of FIG. 4;

FIG. 6 is a side elevation view of a portion of the device of FIG. 3 showing a detachable toothbrush in position thereon;

FIG. 7 is a side elevation view of another embodiment of the invention;

FIG. 8 is an enlarged sectional view of the driving mechanism of the toothbrush of FIG. 7;

FIG. 9 is an enlarged sectional view of the brush of the device of FIG. 7;

FIG. 10 is a sectional view illustrating a modified form of the drive; and

FIGS. 11 and 12 are perspective and sectional views respectively illustrating another embodiment of the driving mechanism for use with the devices of this invention.

Referring now to the drawings in FIG. 1 there is illustrated an oral hygiene appliance 10 having a reservoir 11 in position to supply water thereto. The appliance is actuated by an electric motor (not shown) which drives a pump to produce an intermittent stream comprising pressure pulses separated by rest periods. This stream is supplied through a conduit 12 to a fixture 13 which has been shown connected to supply the stream to a toothbrush assembly 14 embodying the present invention. The assembly 14 includes a brush having bristles 15 and connected by a shaft 16 to be reciprocated by the operation of the hydraulic motor in the body of the assembly 14.

The pump employed in the appliance 10 is illustrated in FIG. 2 which is a sectional view showing the reservoir 11 in position on the top of the unit 10 directly above a pump body indicated at 17. The body 17 is formed to provide a block 18 within which there is formed an upright cylinder 19; immediately above the cylinder there is a pump chamber 21 connected to the cylinder 19 by a port 22. Water for the pump is applied from an inlet chamber 23 of upright cylindrical configuration and is admitted to the chamber 21 through an inlet port 24. The inlet port is controlled by a spring pressed valve 25 which is mounted in a spider comprising a hub 26 and a ring 27 mounted centrally of the chamber 21; the ring is locked in position by a threaded fitting 28 having a cone shaped passage 30 formed therein which terminates in the outlet passage 31 of the pump. In order to supply water to the inlet chamber 23 the bottom of the reservoir 11 is formed with a downwardly extending boss 32 which is sealed to the walls of the chamber 23 by an O-ring 33. The reservoir is provided with an outlet valve 34 which is biased by gravity to its closed position; when the reservoir is placed in position on the unit the valve is lifted by a post 35 as shown so that the passage from the reservoir to the chamber 23 is open.

During the operation of the pump the piston, indicated at 36, is reciprocated in the cylinder 19 and draws water in from the reservoir and chamber 23 through the port 24 to the chamber 21 and thence into the cylinder through the port 22. When the direction of the piston is reversed water is discharged from the cylinder 19 into the chamber 21 and thence out through the outlet 31. Because of the inertial characteristics of the flow of water from the chamber 21 through the conduit 12, there being no discharge valve, there is a tendency for water to continue to flow after the piston has reached its uppermost position and started to return; thus more water is discharged from the pump than the amount displaced by the piston. This type of flow has proved advantageous for use in applicances such as the appliance 10. The stream produced by this pump may be utilized to drive the toothbrush 14 in a manner which will be apparent from the following description.

The body of the toothbrush as shown in FIG. 3 and 4 is generally round in cross section and tapers generally toward the right. The body comprises a shell 38 constructed of suitable hard plastic material. The inlet for the motor is shown as a nipple 39 which may be engaged by the fitting 13 of the appliance 10 as indicated in FIG. 3. The fitting 13 when it is engaged in the manner shown in FIG. 3 may be rotated from its position at the top where the fitting engages the conduit 12 and lies within an opening or recess 41 to a substantially opposite position where the outlet lies within a corresponding opening 42. When the fitting is in this position leakage between the fitting and the nipple 39 is prevented by an O-ring indicated at 43. When the fitting is to be placed in the position shown in FIG. 3 it is first placed over the nipple 39 and then moved downwardly into the position shown wherein the far end of the fitting is engaged in a pocket formed by a curved wall portion 40 of the shell 38. Removal of the fitting from its position in the shell 38 is faciiltated by providing an opening 40a in the bottom of the shell along the handle portion of the fitting so that the fitting may be gripped between the thumb and finger and released from the pocket 40. The nipple 39 is provided with a central passage which leads directly to a cylinder 44 formed in a block 45 of the pump assembly. The assembly further includes a cylindrical portion 46 of greater diameter then the block 45 and which is securely attached to an end piece 47 which also carries the forward end of the shell 38. Along the upper side of the cylinder 46 there is formed an extension 48 within which there is a longitudinal groove 50; this upper extension 48 of the cylinder 46 extends backward beyond the main portion of the cylinder and above the cylinder 45 wherein it merges with an upright cylindrical portion 51 within which there is arranged a valve assembly actuated by a push button 52. A passage indicated at 53 which is an extension of the groove 50 is in communication with the interior of the cylindrical portion 51 and this portion is also in communication with the inlet through a duct 54.

The mechanism is actuated by reciprocation of a piston 55 in the cylinder 44; this reciprocation being effected by the admission of pressure pulses to the cylinder to cause forward motion of the piston and subsequent return under a biasing spring in a manner to be described. The parts of the mechanism as is indicated are of plastic as this material has been found well suited for this purpose. The drive assembly includes a cylindrical tube 56 within which is mounted a smaller tube 57 which extends beyond the tube 56 and terminates in a portion 58 for attachment of the brush shaft. The opposite end of the cylinder 56 terminates in a disc 60 having a diameter slightly less then the internal diameter of the cylinder 46 as indicated in FIG. 5. This disc is provided with an extension 61 which rides in the groove 50 and prevents rotation of the cylinder assembly. In order to bias the piston 55 to its low volume position at the right as shown in FIG. 4 a compression spring 62 is loosely positioned about the cylinder 56 and abutts the end member 47 and the disc 60 to urge the piston toward the right. Thus as soon as the pressure pulse ceases the piston begins to move toward the right.

The operation of the system with the pump illustrated in FIG. 2 is such that when the piston 55 moves to the right water is returned to the pump and it is not necessary to supply additional water from the chamber 23. The operation thus can continue without removing substantial quantities of water from the reservoir 11. It is desirable, however, particularly for starting of the hydraulic motor of the toothbrush that any air or gas in the system be purged from the system in order to secure uniform and steady operation. It is for the purpose of purging the system and also for the additional purpose of occasionally supplying water to the zone of the bristles 15 of the brush that the push button valve 52 has been provided. The valve assembly which is fitted within the cylinder extension 51 comprises a cylindrical side wall 63 having mounted therein a lower disc 64 and an upper disc 65. The lower disc having an opening which is a valve port and the upper disc an opening affording sliding of the valve stem indicated at 66. This upper disc may be provided with an O-ring indicated at 67 to minimize leakage of water from the system during the pressure pulses. The opening in the lower disc may be closed by a disc 68 secured to the bottom of the stem 66. During the pressure pulses disc 68 is forced against the stationary disc 64 and prevents the passage of water through the valve. Should it be desired to supply water through the valve a button 52 is pressed whereupon during the pressure pulse water flows through the hole in the disc 64 and enters the passage 53 through a port 70 in the cylindrical wall 63. This water reaches the interior of the cylinder 46 through the spaces about the disc 60 and from the cylinder flows out through passages 71 on either side of the cylinders 56 and 57 and reaches a central passage in the member 57 as indicated at 73 this passage is in direct communication with the toothbrush through a passage 74 provided in the shaft of the toothbrush as indicated in dotted lines in FIG. 6.

For operation of the toothbrush illustrated in FIGS. 1 through 6, the motor of the appliance 10 is first started and is allowed to run. The valve button 52 is pressed downward briefly to allow a flow of fluid through the toothbrush for a short period of time. Air is thereby purged from the system assuring maximum response of the hydraulic motor to the pulse flow conditions. Thereafter the brush may be operated continuously and when it is desired to supply water to the zone of the bristles for rinsing or other purposes this is done by again pressing the valve button 52.

The structural features of the foregoing embodiment of my invention relating to the driving of the toothbrush from a pump having no discharge valve and including the push button bypass or purging valve are part of an invention made jointly with Siegmund Deines, Homer A. Jeffers, Jr. and Wayne W. Monroe, which joint invention is described and claimed in our copending application Ser. No. 697,836 filed Jan. 15, 1968, and assigned to the same assignee.

In FIG. 7 another embodiment of the invention is illustrated in which the toothbrush assembly indicated generally at 75 comprises a body portion 76 containing the hydraulic motor and driving mechanism and a toothbrush mounted on the portion 76 comprising a shaft 77 and a head 78 within which are mounted bristles 80. The assembly 75 has been shown connected to the fitting 13 of the unit 10 of FIG. 1 and supplied through the conduit 12 of that unit. FIG. 8 shows the construction of the motor unit 76 which comprises an outer cylindrical shell 81 which may be of a relatively hard plastic and which has a cylinder block 82 securely bonded thereto in the lefthand end thereof, the block 82 terminating in a nipple 83 through which a pulsed stream of liquid may be supplied to the motor. The motor comprises a piston 84 mounted within a cylinder 85 formed in the block 82 centrally thereof for longitudinal reciprocating movement. The piston 84 is formed as an integral part of a piston assembly comprising a main shaft 86 and a block 87 slidably fitted in the outer end of the tube 81. The cylinder block 82 is provided with a stepped portion 88 providing an annular shoulder within a chamber 90 formed between the block 82 and the head 87; the head 87 is also provided with a stepped portion providing an annular shoulder 91 of the same height as the shoulder 88. In order to bias the piston 84 to its low volume position at the left as shown in the drawing a sleeve 92 of highly elastic material such as surgical rubber tubing is fitted about the annular shoulders 88 and 91 and may be cemented thereto to prevent leakage. The piston 84 is hollow, it being provided with an internal passage 93, and is provided with a port 94 near the righthand end of the passage. When the piston moves to the right under the pressure of a pulse in the inlet passage indicated at 95, the piston moves to the left until it moves to a point where the port 94 clears the shoulder 88 whereupon liquid is discharged into the chamber formed between the elastic tubing 92 and the body of the shaft 86. Water is discharged from the chamber within the tubing 92 through a port 96 communicating with a righthand passage 97; this passage is formed in the piston assembly and terminates in a cylindrical fitting 98 to which the toothbrush shaft shown in FIG. 9 may be securely attached by means of a set screw 100. It will now be apparent that during the forward movement of the piston the tubing 92 is stretched and the size of the chamber formed between the tubing and the rod 86 increased. As soon as the pressure pulse subsides the piston assembly is pulled toward the left and the liquid within the tubing chamber discharged through the passage 97 into the toothbrush shaft 77; this shaft is provided with a passage 101 terminating in small outlets 102 adjacent the bristles 80. Thus the operation of the brush results in the supplying of water to the area of the bristles during brushing. When the brush shown in FIG. 8 is actuated by pulses supplied from the pump of FIG. 2 and depending upon the pressure setting of the pump (controlled by a bypass not illustrated in the drawing) the piston 84 may be operated so that it does not move sufficiently far to the right to open the port 94 whereupon the operation of the brush is essentially similar to that of the brush of FIGS. 3 and 4. The brush of the present embodiment may also be operated from a pump which is provided with an exhaust valve such as the pump employed in my above identified patent, and then a continuous flow of water is discharged through the ports 94 and 96.

FIG. 10 illustrates a motion converting device which may be employed, for example, in the assembly shown in FIG. 8. Corresponding parts of the device of FIG. 10 have been given the same numerals as those of FIG. 8 with the suffix leter "a." In this modification the head of the piston assembly indicated at 87a is provided with a spiral groove 103 and a pin 104 rigidly secured to the housing and which extends into the groove in sliding engagement therewith. When the head 87a is forced outwardly by the pressure pulse the outward movement is converted to both outward and rotary movement due to the turning effect of the groove 103 as it moves past the pin 104. The resulting action is thus both a reciprocating and a rotating action of the bristles of the toothbrush.

For some applications it may be desirable to have only a rotating action of the bristles of the brush and for this purpose the converting mechanism illustrated in FIGS. 11 and 12 may be employed. The mechanism illustrated in FIGS. 11 and 12 is, in part, essentially the same as that illustrated in FIG. 8 and corresponding parts have been designated by the same numerals with the suffix letter "b." As shown in FIGS. 11 and 12 the reciprocating head 87b when moving back and forth in the cylindrical tubing 81b is rotated by co-action of the pin 104b and the spiral groove 103b rotation being effected in the same manner as in the arrangement of FIG. 10. In order to convert the rotary and reciprocating movement into solely rotary movement the tubing 81b is extended sufficiently to provide for additional parts described below. The block 87b is provided with an extension 106 comprising a cutaway portion of the cylinder providing a central flat sided configuration. This extension is arranged to fit within a complementary slot formed within a head member 107 which is rotatably mounted within the cylinder 81b; the head 107 is provided with an extension 108 which is a hollow tubular portion mounted within a bearing 109 and extending through a retaining collar 111. The retaining collar is securely held to the cylinder 81b by a set screw 112. Both the heads 87b and 107 are provided with central pasageways which aline with the passageways in the rod member 86b and the extension 108. Thus the water discharged through the orifice 96 of FIG. 8 will be carried through the assembly to the tube 108 which corresponds to the tube 98 of FIG. 8.

During the operation of the motion converting device shown in FIGS. 11 and 12 the head 87b rotates and reciprocates however since the extension 106 is slidable freely within the complementary extension in the block 107 the block 107 is not reciprocated but is rotated, thereby the movement transmitted through the extension 108 is solely rotary and the bristles of the toothbrush when the shaft 77 is secured on the extension 108 will be solely rotation.

Both the reciprocating and the rotary movements provide a back and forth movement of the brush for application to the teeth.

It will thus be apparent that this invention provides a system effectively employing a pulsating stream of water to actuate a hydraulic motor and drive a toothbrush with a back and forth movement which may be employed for effective cleaning of the teeth.

I claim:

1. A hydraulic drive system for producing back and forth movement comprising a driving means for generating a stream of intermittent liquid pressure pulses spaced from one another by rest periods, a driven device including an expansible chamber means movable between positions of minimum and maximum capacity for affording back and forth movement thereof, means biasing said expansible chamber means to its minimum capacity position, conduit means connecting said generator and said expansible means for transmitting the pressure pulses from said generator to said expansible chamber means for producing forward motion of said driven device during the pressure pulse and return movement during the period of rest between pulses, and means for exhausting liquid from said system during the return stroke of said driven device.

2. A hydraulic drive system for producing back and forth movement comprising a driving means for generating a stream of intermittent liquid pressure pulses spaced from one another by rest periods, a driven device including an expansible chamber means movable between positions of minimum and maximum capacity for affording back and forth movement thereof, means biasing said expansible chamber means to its minimum capacity position, conduit means connecting said generator and said expansible means for transmitting the pressure pulses from said generator to said expansible chamber means for producing forward motion of said driven device during the pressure pulse and return movement during the period of rest between pulses, said generating means comprising an oral hygiene appliance of the intermittent pulse type and said conduit comprising the flexible output conduit of said appliance having an output fixture and said driven device comprising a toothbrush, and means for detachably and rotatably coupling the output fixture of said appliance to the input of said expansible chamber device.

3. A motor driven toothbrush for use with an oral hygiene appliance of the type having an output fixture for delivering a stream of intermittent liquid pressure pulses comprising a handle and a toothbrush mounted thereon for back and forth movement, a hydraulic motor of the expansible chamber type movable between minimum and maximum volume positions mounted in said handle and connected to drive said toothbrush with back and forth movement, means for biasing said motor to its minimum capacity position, and means for detachably connecting the stream discharge fixture of an intermittent liquid pressure pulse oral hygiene appliance to said handle with the output thereof in closed communication with said expansible chamber motor, said least mentioned means affording at least limited rotation of said handle with respect to the fixture.

4. A motor driven toothbrush for use with an oral hygiene appliance of the type having an output fixture for delivering a stream of intermittent liquid pressure pulses comprising a handle and a toothbrush mounted thereon for back and forth movement, a hydraulic motor of the expansible chamber type movable between minimum and maximum volume positions mounted in said handle and connected to drive said toothbrush with back and forth movement, means for biasing said motor to its minimum capacity position, means for detachably connectnig the stream discharge fixture of an intermittent liquid pressure pulse oral hygiene appliance to said handle with the output thereof in closed communication with said expansible chamber motor, and means for delivering to the zone of the bristles of said toothbrush fluid received from the discharge fixture.

5. A motor driven toothbrush for use with an oral hygiene appliance of the type having an output fixture for delivering a stream of intermittent liquid pressure pulses comprising a handle and a toothbrush mounted thereon for back and forth movement, a hydraulic motor of the expansible chamber type movable between minimum and maximum volume positions mounted in said handle and connected to drive said toothbrush with back and forth movement, means for biasing said motor to its minimum capacity position, said motor being of the reciprocating type, means for converting the reciprocating movement of the motor to oscillating movement of said toothbrush, and means for detachably connecting the stream discharge fixture of an intermittent liquid pressure pulse oral hygiene appliance to said handle with the output thereof in closed communication with said expansible chamber motor.

6. A motor driven toothbrush for use with an oral hygiene appliance of the type having an output fixture for delivering a stream of intermittent liquid pressure pulses comprising a handle and a toothbrush mounted thereon for back and forth movement, a hydraulic motor of the expansible chamber type movable between minimum and maximum volume positions mounted in said handle and connected to drive said toothbrush with back and forth movement, means for biasing said motor to its minimum capacity position, said motor comprising a cylinder block with a cylinder therein and a piston mounted for reciprocation in the cylinder, said piston having a longitudinal extension and said toothbrush being connected to be driven thereby, said biasing means comprising a sleeve of elastic material surrounding said extension and sealed thereto and to said block, and means for detachably connecting the stream discharge fixture of an intermittent liquid pressure pulse oral hygiene appliance to said handle with the output thereof in closed communication with said expansible chamber motor.

7. A motor driven toothbrush as set forth in claim 6 including an inlet passage in said piston and a port therein movable between a closed position within said cylinder and an open position beyond said cylinder for release of fluid into the space between said sleeve and said extension, and conduit means in said extension affording a release of fluid to the outside.

8. A motor driven toothbrush as set forth in claim 7 wherein said toothbrush has a passage therein between its base and the zone of the bristles of the brush, and means connecting the passage in said toothbrush and said conduit means in said extension for releasing discharged fluid adjacent the zone of the bristles.

9. A motor driven toothbrush for use with an oral hygiene appliance of the type having an output fixture for delivering a stream of intermittent liquid pressure pulses comprising a handle and a toothbrush mounted thereon for back and forth movement, a hydraulic motor of the expansible chamber type movable between minimum and maximum volume positions mounted in said handle and connected to drive said toothbrush with back and forth movement, means for biasing said motor to its minimum capacity position, said motor being of the reciprocating type, the connection with said toothbrush comprising means including a rotatable member connected to be reciprocated by said motor and helical guide means between said rotatable member and said handle for producing oscillation of said rotatable member during reciprocation thereof, and means for detachably connecting the stream discharge fixture of an intermittent liquid pressure pulse oral hygiene appliance to said handle with the output thereof in closed communication with said expansible chamber motor.

10. A motor driven toothbrush as set forth in claim 5 wherein said converting means comprises a first member rotatably mounted on said handle and constituting the means for mounting said toothbrush thereon, a second member mounted in said handle for rotation therein and connected between said handle and said motor for reciprocation by said motor, helical guide means connected between said handle and said second member for rotating said second member upon reciprocation thereof, and an axial sliding connection between said second member and said first member for affording rotation of said first member while preventing reciprocation thereof.

References Cited

UNITED STATES PATENTS

| | | | |
|---|---|---|---|
| 1,945,616 | 2/1934 | Mastrud | 15—22 X |
| 2,196,667 | 4/1940 | Moseley | 15—22 |
| 2,290,454 | 7/1942 | Steinberg. | |
| 2,384,435 | 9/1945 | Bodine | 60—54.5 X |
| 3,093,900 | 6/1963 | Myers. | |
| 3,213,471 | 10/1965 | Freeman | 15—22 |
| 3,284,829 | 11/1966 | Allen | 15—22 |

EDWARD L. ROBERTS, Primary Examiner

U.S. Cl. X.R.

91—468